United States Patent [19]

MacDonald

[11] 4,330,054
[45] May 18, 1982

[54] AMPLIFYING CLUTCH WITH RADIALLY CONTRACTIBLE SHOE

[75] Inventor: J. G. Fraser MacDonald, Detroit, Mich.

[73] Assignee: Warner Electric Brake & Clutch Company, South Beloit, Ill.

[21] Appl. No.: 151,340

[22] Filed: May 19, 1980

[51] Int. Cl.³ .................. F16D 13/08; F16D 67/02
[52] U.S. Cl. .................. 192/35; 192/18 R; 192/41 S; 192/48.4; 192/81 C
[58] Field of Search .............. 192/35, 36, 37, 41 S, 192/48.4, 18 R, 81 C

[56] References Cited

U.S. PATENT DOCUMENTS

| | | | |
|---|---|---|---|
| 3,149,705 | 9/1964 | Shoquist | 192/35 |
| 3,149,706 | 9/1964 | Mason et al. | 192/35 |
| 3,177,995 | 4/1965 | Mason | 192/35 |
| 3,685,622 | 8/1972 | Baer et al. | 192/81 C X |
| 3,915,268 | 10/1975 | MacDonald | 192/12 BA |
| 3,978,947 | 9/1976 | Modersohn | 192/12 BA |
| 4,201,281 | 5/1980 | MacDonald | 192/35 |
| 4,213,521 | 7/1980 | Modersohn | 192/18 R |

*Primary Examiner*—Allan D. Herrmann
*Attorney, Agent, or Firm*—Leydig, Voit, Osann, Mayer & Holt, Ltd.

[57] ABSTRACT

Pilot torque is transmitted from the input member to the output member of a clutch when a shoe is pressed axially against the input member. When initially turned by the input member, the shoe causes a helical spring to wrap down on angularly spaced shoe segments and to contract the shoe segments into radial gripping engagement with the input member. The shoe segments engage angularly spaced drive lugs on the output member to transmit torque to the output member.

4 Claims, 4 Drawing Figures

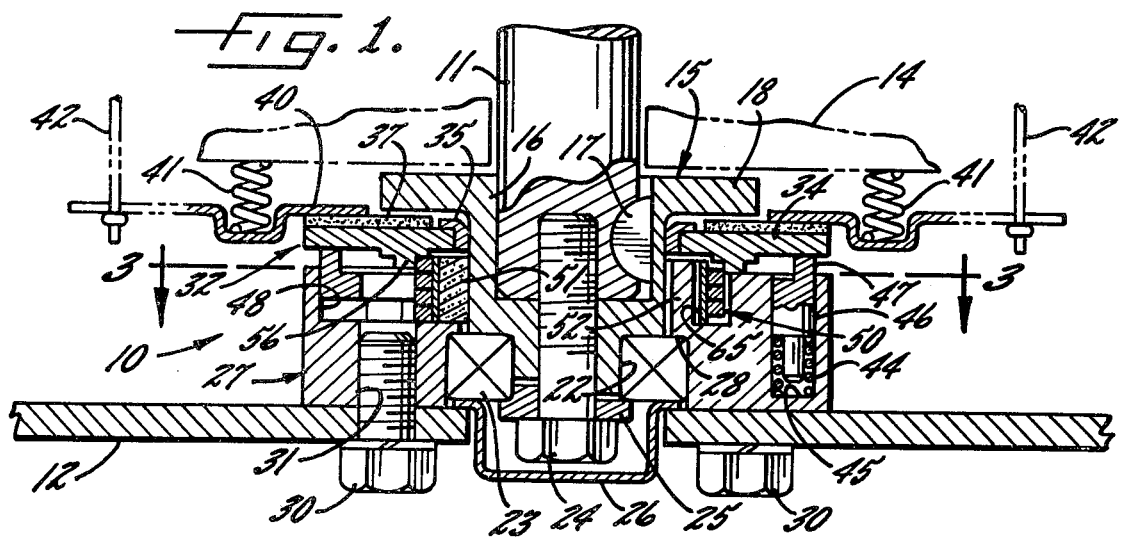
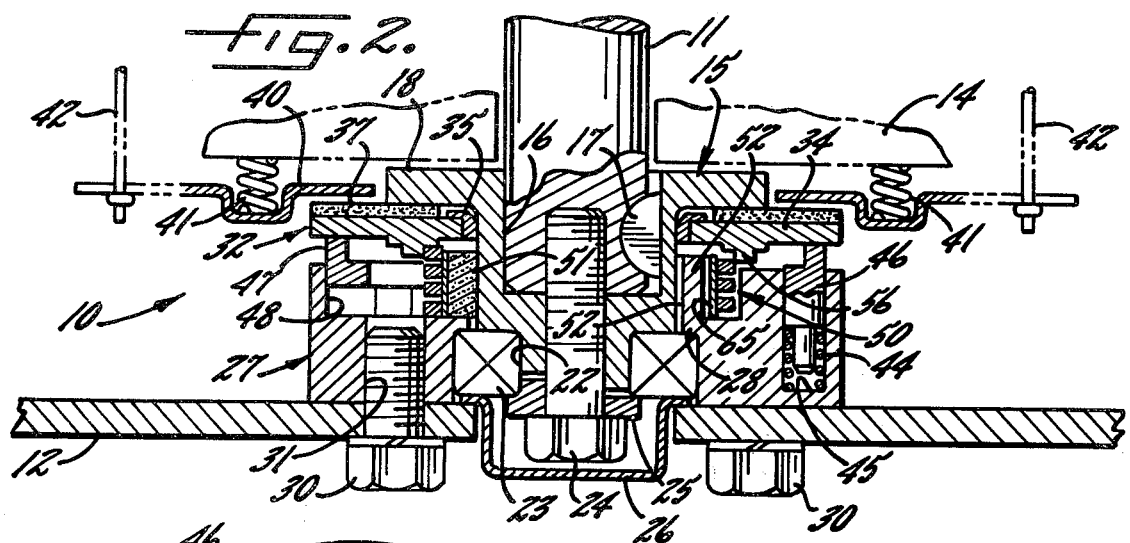
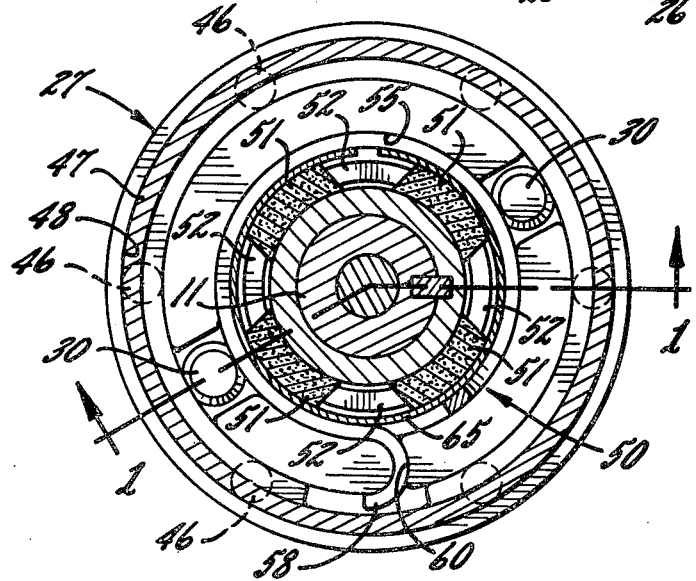

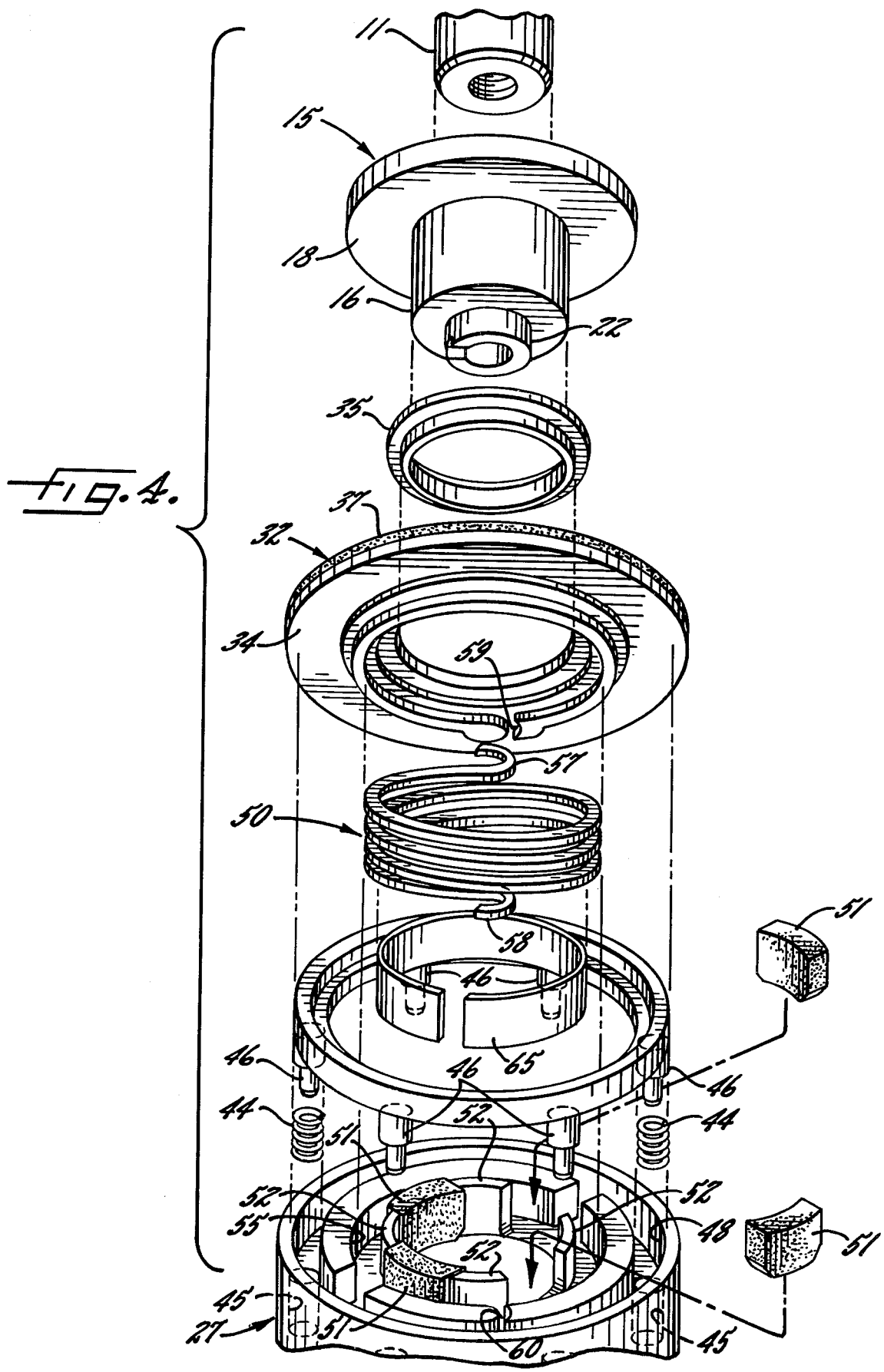

AMPLIFYING CLUTCH WITH RADIALLY CONTRACTIBLE SHOE

BACKGROUND OF THE INVENTION

This invention relates to a clutch of the type in which an input member and an output member are coupled to rotate in unison when a friction shoe is moved into frictional engagement with the input member. The invention more specifically relates to a clutch in which the friction shoe may be engaged with relatively low force and in which the force acting on the friction shoe is amplified to enable the clutch to possess relatively high torque capacity.

An amplifying clutch of this general type is disclosed in MacDonald U.S. Pat. No. 4,286,701. In that clutch, ball ramps amplify the torque imparted to the friction shoe and force a secondary shoe into engagement with the input member to enable torque to be transmitted between the input and output members by way of the secondary shoe.

SUMMARY OF THE INVENTION

The general aim of the present invention is to provide a new and improved amplifying clutch which is simpler in construction and more reliable in operation than prior clutches of the same general type.

A more detailed object is to achieve the foregoing by providing a clutch in which a helical spring amplifies the pilot torque and causes angularly spaced shoe segments to radially grip the input member and to transmit torque of substantial magnitude from the input member to the output member.

A further object is to provide a clutch in which the helical spring is prevented from self-energizing so as to enable the clutch to engage softly and without abrupt shock loads.

Still another object is to provide a clutch in which the output member is formed with angularly spaced drive lugs which coact with the shoe segments to transmit torque and which guide the shoe segments for radial sliding.

These and other objects and advantages of the invention will become more apparent from the following detailed description when taken in conjunction with the accompanying drawings.

BRIEF DESCRIPTION OF THE DRAWINGS

FIG. 1 is a fragmentary vertical sectional view of a new and improved clutch incorporating the unique features of the present invention, the clutch being in a disengaged condition and being shown as taken substantially along the line 1—1 of FIG. 3.

FIG. 2 is a view similar to FIG. 1 but shows the clutch in an engaged condition.

FIG. 3 is a cross-sectional view taken substantially along the line 3—3 of FIG. 1.

FIG. 4 is an exploded perspective view of certain parts of the clutch.

DETAILED DESCRIPTION OF THE PREFERRED EMBODIMENT

As shown in the drawings for purposes of illustration, the invention is embodied in a clutch 10 for selectively coupling a rotatable driving element 11 to a rotatable driven element 12. In the present instance, the driving element 11 is the shaft of a motor or engine (not shown) while the driven element 12 is the rotary blade of a lawnmower. The shaft 11 extends through the deck 14 of the mower with the blade 12 being located below the deck. The shaft rotates in a clockwise direction as viewed in FIG. 3.

The clutch 10 comprises an input member 15 having a tubular hub 16 which is keyed to the driving shaft 11 at 17. A flange 18 extends radially from the upper end of the hub. At its lower end, the hub is formed with a reduced diameter sleeve 22 which supports a ball bearing 23. The bearing is held in place by a screw 24 which projects through a key-type collar 25 and the sleeve 22 and which is threaded into the lower end of the shaft 11, the bearing thereby being clamped between the collar and the lower end of the hub 16. A flanged cup 26 covers the screw 24 and the collar 25 and, as will appear later, is clamped against the lower end of the bearing to protect the bearing from dirt and the like.

The clutch 10 further comprises an annular output member 27 which is journaled on the bearing 23 for selective rotation relative to the shaft 11, the output member being formed with an upper flange 28 (FIG. 1) which captivates the output member against downward movement relative to the bearing. Screws 30 extend through the blade 12 and are threaded into holes 31 in the output member to cause the blade to rotate with the output member and, at the same time, to clamp the cup 26 between the blade and the bearing 23.

To couple the output member 27 for rotation with the input member 15, the clutch 10 includes an annular shoe 32 (FIGS. 1 and 4), having a disc 34 located between the input and output members and rotatably supported by a bushing 35 which is telescoped over the hub 16 of the input member 15. A layer of suitable friction material 37 is bonded to the upper side of the disc 34 and is adapted to engage the lower side of the flange 18 of the input member 15.

When the clutch 10 is in a disengaged condition as shown in FIG. 1, the friction material 37 of the shoe 32 is held out of effective contact with the flange 18 of the input member 15 by a manually operable element in the form of an actuator ring 40 which is suitably supported for up and down movement beneath the deck 14 of the mower. The actuator ring 40 is urged downwardly by a series of angularly spaced coil springs 41 which are compressed between the ring and the deck 14. The springs normally hold the ring 40 in engagement with the friction material 37 on the disc 34 and normally cause the friction material to be spaced downwardly from and out of engagement with the flange 18 of the input member 15. Cables 42 or the like are connected between the ring and a suitable part such as an operating lever (not shown) on the handle of the mower. When the operating lever is actuated manually to pull on the cables, the ring 40 is lifted away from the friction material 37 (see FIG. 2).

As an incident to lifting of the actuator ring 40, the friction material 37 of the shoe 32 is moved into the frictional contact with the flange 18 of the input member 15 to cause the clutch 10 to engage. For this purpose, six angularly spaced coil springs 44 are telescoped into holes 45 in the upper side of the output member 27 and are compressed between the output member and the heads of angularly spaced pins 46 disposed slidably in the holes, the pins being molded of a suitable plastic such as Delrin and having shanks telescoped into the holes. Molded integrally with the heads of the pins is a collar 47 whose lower end portion is slidably received in an annular groove 48 (FIG. 4) in the upper side of the output member 27 and whose upper end is biased against the lower side of the disc 34 by the springs 44. Thus, the springs 44 act against the collar 47 which, in turn, bears against the disc 34 to press the friction material 37 of the shoe 32 into engagement with the flange 18 of the input member 15. In addition, the collar 47 spans and closes the axial gap between the output member 27 and the shoe 32 and prevents dirt and other foreign material from passing through such gap.

The combined force of the springs 44 is less than the combined force of the springs 41 and thus the springs 41 normally are effective to overcome the springs 44 and hold the friction material 37 on the shoe 32 downwardly away from the flange 18 of the input member 15 as long as the operating lever is released and the cables 42 are loose (see FIG. 1). When the operating lever is manually moved to and held in an actuated position, the ring 40 is lifted away from the shoe 32 to permit the springs 44 to press the friction material 37 upwardly into engagement with the flange 18 of the input member 15 and to cause the shoe 32 to turn with the input member (see FIG. 2).

In accordance with the present invention, rotation of the shoe 32 by the flange 18 of the input member 15 causes a coiled helical spring 50 to wrap down on a series of angularly spaced shoe segments 51 and to press the shoe segments radially inwardly into gripping engagement with the hub 16 of the input member. The shoe segments are uniquely disposed between angularly spaced drive lugs 52 (FIGS. 3 and 4) on the output member 27 and, when the helical spring 50 causes the shoe segments to grip the input hub 16, the shoe segments turn with the hub and transmit torque to the output member by way of the drive lugs.

With the foregoing arrangement, the springs 44 press the shoe 32 into engagement with the flange 18 of the input member 15 to create pilot torque which is transmitted between the input and output members 15 and 27. The pilot torque is amplified by the action of the helical spring 50 and the shoe segments 51 to cause torque of substantial magnitude to be transmitted between the input and output members via the input hub 16, the shoe segments and the drive lugs 52. As will become apparent subsequently, the torque amplification is achieved without producing self-energization of the helical spring 50 and thus the clutch 10 engages softly and without shock and without imposing high torque on the helical spring itself.

More specifically, the lower end portion of the helical spring 50 is disposed within an annular groove 55 (FIG. 3) in the upper side of the output member 27 while the outer side of the upper end portion of the spring is captivated by a downwardly projecting ring 56 (FIG. 4) formed integrally with the lower side of the disc 34. Upper and lower reversely curved tangs 57 and 58 are formed at the upper and lower ends of the spring. As shown in FIG. 4, the upper tang 57 is hooked through a slot 59 formed in the ring 56. The lower tang is hooked through a slot 60 (FIG. 3) which is formed in the output member 27 and which extends radially between the grooves 48 and 55. Thus, one end 57 of the spring 50 is anchored to the shoe 32 while the other end 58 of the spring is anchored to the output member 27. When the shoe is initially turned by the flange 18 of the input member 15, the relative rotation which results between the two ends of the spring causes the spring to wrap down or contact in a radially inward direction.

The shoe segments 51 are disposed inside of the helical spring 50 and are pressed radially inwardly into gripping engagement with the input hub 16 by the spring when the latter is wrapped down. Herein, there are four angularly spaced shoe segments and each is formed by a block of friction material having a concavely curved inner face and a convexly curved outer face. The inner face of each shoe segment is curved on approximately the same radius as the input hub 16 while the outer face of each segment is curved on approximately the same radius as the inside of the helical spring 50. The inner faces of the shoe segments 51 are disposed in direct engagement with the input hub 16 but the outer faces of the segments are shielded from direct engagement with the spring 50 by an axially split and radially contractible sleeve 65 (FIG. 4). That sleeve is telescoped over the shoe segments and into the spring and is made of a suitable bearing material having a low coefficient of friction.

As shown in FIGS. 3 and 4, the output member 27 is formed with four angularly spaced and axially projecting drive lugs 52 extending upwardly from the bearing 23 and disposed between the input hub 16 and the sleeve 65. The lugs are located between the shoe segments 51 and are positioned in face-to-face engagement with the circumferentially facing side surfaces of the segments. Thus, the lugs 52 guide the shoe segments 51 for radial sliding and, at the same time, the segments are disposed in torque transmitting engagement with the lugs.

SUMMARY OF OPERATION

When the actuator ring 40 is lifted to engage the clutch 10, the springs 44 force the shoe 32 upwardly from the position shown in FIG. 1 to the position shown in FIG. 2 and press the friction material 37 of the shoe against the flange 18 of the input member 15. The shoe thus starts turning with the input member and turns through a limited distance relative to the output member 27 so as to turn the tang 57 of the spring 50 relative to the tang 58. Torque of relatively small magnitude is transmitted from the input member 15 to the output member 27 by way of the flange 18, the shoe 32 and the collar 47.

When the tang 57 of the spring 50 is turned relative to the tang 58, the spring wraps down tightly on the split sleeve 65 and contacts the shoe segments 51 into tight frictional engagement with the hub 16 of the input member 15. The shoe segments 51 thus start turning with the input hub and act through the drive lugs 52 to transmit torque to the output member 27. Thus, the pilot torque which is created by the springs 44 pressing the shoe 32 into frictional engagement with the flange 18 is amplified by the helical spring 50 and the shoe segments 51 so that torque which is high in magnitude when compared with the force of the springs 44 is transmitted between the input hub 16 and the drive lugs 52 by the shoe segments. When the helical spring begins to wrap down, the low friction between the sleeve 65 and the coils of the spring enables the coils to slide circumferentially around the sleeve rather than engaging the sleeve with high friction. The highest torque which is imposed on the helical spring is exerted on the uppermost coil thereof. Because of the low friction between the spring 50 and the sleeve 65, the torque in the succeeding coils does not decay as rapidly as is the case in a high friction condition and thus more of the torque is effectively used as a radial clamping force to contract the shoe segments 51.

It will be noted that the helical spring 50 does not contact the input hub 16 and that there is substantially no slippage between the spring and the sleeve 65 once the shoe segments 51 begin to turn. As a result, there are virtually no friction forces which cause the spring to self-energize or to wrap down more tightly than the wrap which is produced by the pilot torque. Accordingly, the torque which is transmitted directly between the input and output members 15 and 27 by the helical spring 50 itself is relatively low and is directly proportional to the pilot torque. This enables a relatively light spring to achieve substantial torque amplification without producing high torque peaks and shock loads during initial engagement. Thus, the clutch 10 engages softly and smoothly.

When the operating lever is released to cause the springs 41 to depress the ring 40, the shoe 32 is forced downwardly away from the flange 18 of the input member 15 to interrupt the transmission of torque to the shoe (see FIG. 1). In addition, the ring 40 applies a braking torque to the friction material 37 of the shoe. The braking torque, together with the natural tendency of the helical spring 50 to unwind, causes the shoe 32 to turn reversely through a limited distance relative to the output member 27. As a result, the spring 50 unwinds and releases the shoe segments 51 so that the latter release the input hub 16 to interrupt the transmission of driving torque via the lugs 52. The braking torque applied to the shoe 32 by the ring 40 is transmitted from the shoe to the output member 27 through the collar 47 and the spring 50 and thus braking torque is applied to the output member upon interruption of the driving torque.

I claim:

1. A clutch comprising rotatably mounted input and output members, said input member having a hub and having a flange projecting radially from said hub, a rotatably mounted first shoe supported to move axially relative to said input and output members and to turn angularly through a limited distance relative to said output member, coacting friction surfaces on said flange and said first shoe, said friction surfaces engaging one another and causing said first shoe to turn with said input member and through said limited distance relative to said output member when said first shoe is moved axially toward the flange of said input member, said friction surfaces effectively releasing one another and enabling said input member to turn relative to said first shoe when said first shoe is moved axially away from the flange of said input member, and selectively operable means for causing said first shoe to move axially toward and away from the flange of said input member, said clutch being characterized by a second shoe comprising a series of segments spaced angularly around the hub of said input member, a series of angularly spaced lugs rigid with said output member and located between said segments, said lugs circumferentially engaging said segments to couple said segments for rotation with said output member and also supporting said segments to slide radially toward and away from the hub of said input member, said segments radially and frictionally gripping the hub of said input member and turning with said input member when said segments are moved radially toward said hub, said segments effectively releasing said hub and enabling said input member to turn relative to said segments when said segments are moved radially away from said hub, and a helical spring telescoped over said segments and having ends connected to said first shoe and to said output member, said spring wrapping down on said segments and causing said segments to radially and frictionally grip the hub of said input member in response to said first shoe turning through said limited distance, said segments being free of radial frictional engagement with said output member at all times so that the only transmission of torque between said segments and said output member is effected by virtue of the circumferential engagement of said segments with said lugs.

2. A clutch as defined in claim 1 in which the hub of said input member is telescoped into the lugs of said output member.

3. A clutch as defined in claims 1 or 2 further including an axially split sleeve telescoped into said spring and over said segments.

4. A clutch as defined in claim 1 in which said selectively operable means include axially extending coil springs compressed against said output member, and a collar supported by said output member for axial sliding and pressed against said first shoe by said coil springs, said collar extending circumferentially around said output member and said first shoe and closing the gap therebetween.

* * * * *